US005697135A

United States Patent [19]

Dischler

[11] Patent Number: 5,697,135

[45] Date of Patent: Dec. 16, 1997

[54] PRESS TOOL

[75] Inventor: Helmut Dischler, Neuss, Germany

[73] Assignee: Novopress GmbH Pressen und Presswerkzeuge, Germany

[21] Appl. No.: 448,437

[22] PCT Filed: Nov. 25, 1993

[86] PCT No.: PCT/EP93/03302

§ 371 Date: Jun. 2, 1995

§ 102(e) Date: Jun. 2, 1995

[87] PCT Pub. No.: WO94/12297

PCT Pub. Date: Jun. 9, 1994

[30] Foreign Application Priority Data

Dec. 2, 1992 [DE] Germany .............................. 9216369 U

[51] Int. Cl.[6] .............................................. B23P 19/04

[52] U.S. Cl. .............................................. 29/237; 72/409.01

[58] Field of Search .............................. 269/43; 29/237, 29/243, 517, 519, 270, 272; 72/402, 409.01, 409.08, 409.19

[56] References Cited

U.S. PATENT DOCUMENTS

| | | | |
|---|---|---|---|
| 3,756,064 | 9/1973 | Erdmann | 72/409.01 |
| 3,934,318 | 1/1976 | Mertens | 24/249 |
| 4,934,673 | 6/1990 | Bahler | 269/43 |
| 5,121,625 | 6/1992 | Unewisse et al. | 29/237 |
| 5,148,698 | 9/1992 | Dischler | 29/237 |
| 5,209,100 | 5/1993 | Dischler | 29/237 |
| 5,307,664 | 5/1994 | Homm | 29/237 |

FOREIGN PATENT DOCUMENTS

| | | | |
|---|---|---|---|
| 0451806 | 4/1991 | European Pat. Off. . | |
| 486877 | 5/1992 | European Pat. Off. | 269/20 |
| 1187870 | 10/1965 | Germany . | |
| 3423283 | 1/1986 | Germany . | |
| 3833748 | 4/1990 | Germany . | |
| 4012504 | 8/1991 | Germany . | |

*Primary Examiner*—Robert C. Watson
*Assistant Examiner*—Thomas W. Lynch
*Attorney, Agent, or Firm*—Joseph W. Berenato, III

[57] ABSTRACT

Disclosed is a press tool for pressing tubular inner and outer nested workpieces (e.g. a pipe end upon which is slid a press fitting). The press tool includes a plurality of clamping components which contain clamping jaws having a continuous circumferential pressing groove (63) shaped in their inner sides, the jaws having a pressing land (65) that extends along only one side of the pressing groove. The press tool also includes a template (44) which fits over the inner nested workpiece but not over the outer slid-on workpiece, the template (44) being positioned on the side of the groove (63) opposite the pressing land (65).

8 Claims, 5 Drawing Sheets

PRESS TOOL

Figure 1:
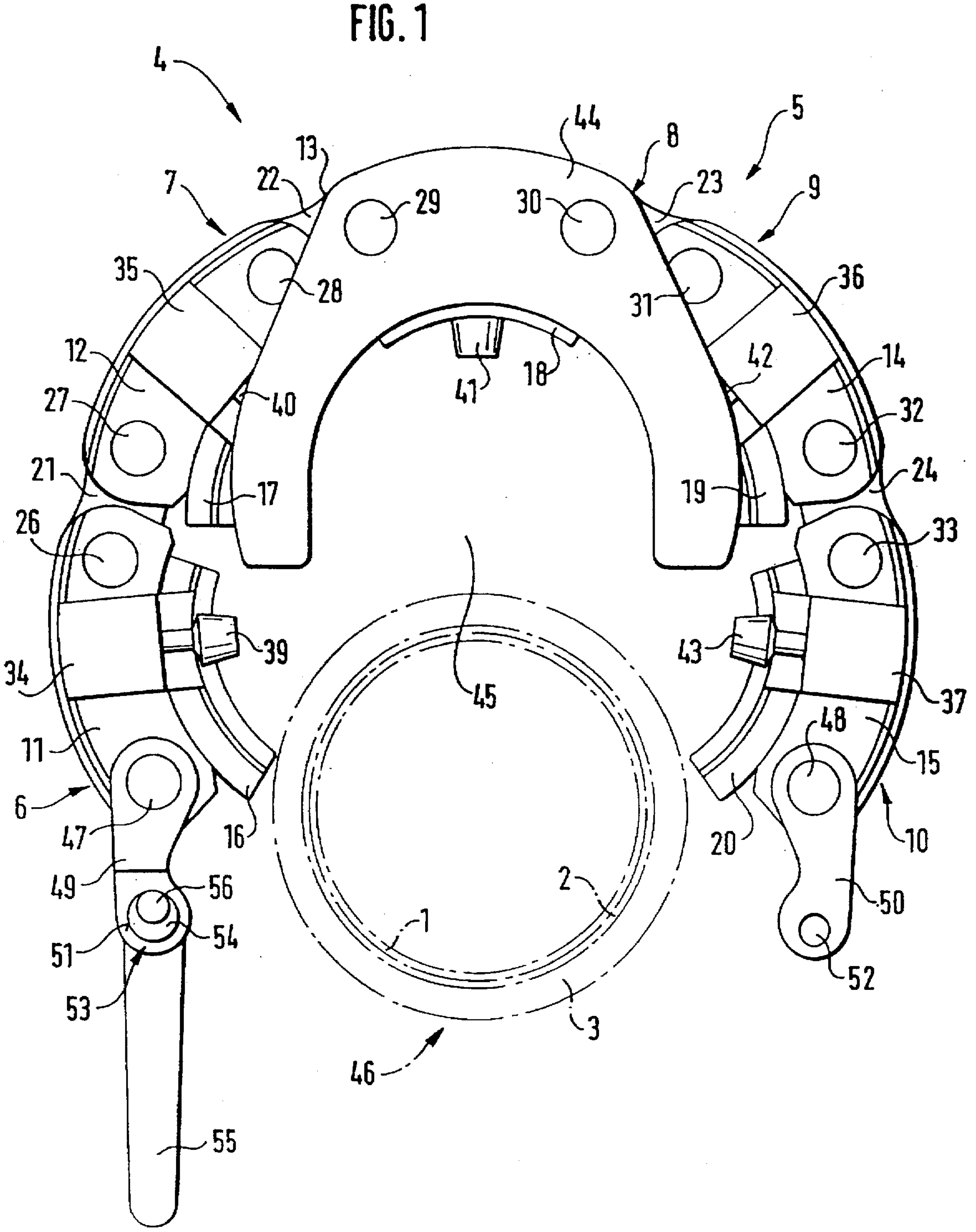

The invention involves a press tool for pressing tubular, nested workpieces, in particular a pipe end upon which is slid a press fitting, having several clamping components which bear clamping jaws with a continuous circumferential pressing groove shaped in their inner side, and containing a pressing land extending along only one side.

One known-in-the-art process for joining the ends of tubular workpieces involves using tubular press fittings that are ductile and are comprised of metal, preferably of steel. Such pipe joints and the associated press fittings can be found, for example, in DE-C-1 187 870 and DE-C-40 12 504.

A wide variety of designs has been developed for press tools that are intended for pressing a press fitting and a pipe end together radially. These press tools contain clamping components with clamping jaws, which in the pressing process are moved radially to form a closed pressing space. In addition to press tools having two clamping jaws (DE-A-34 23 283; DE-A-38 33 748), press tools having more than two clamping jaws, which permits greater insertion depths, are also known-in-the-art. The latter type of press tools can be found, specifically, in EP-A-0 451 806. In relation to this, the press tools illustrated in FIGS. 7 and 8 are of particular interest, as they are suited for the joining of pipe ends that are large and very large in diameter.

As may be found in the similar type DE-C2-38 33 748, the clamping jaws in such press tools contain on their inner side a specific cross-sectional shape that conforms to the shape of the press fitting. Because such press fittings have at their open end an annular ring that protrudes toward the outside, and on the inner side of which a conical nipple is inserted, the clamping jaw contains a pressing groove that is shaped to receive this annular ring. The individual segments of the pressing groove in the clamping jaws join to form a continuous circumferential pressing groove.

In order that the annular ring is not simply pressed onto the pipe end, effecting instead a pressing process between the press fitting and the pipe end, in addition to the annular ring, pressing lands extend on both sides of the pressing groove, which become pressed during the pressing process into the material of the press fittings, and thereby also the nested pipe end. As may also be found in DE-C2-38 33 748, the inclusion of pressing lands on both sides of the pressing groove is not an absolute requirement for the pressing process. However, handling is foolproof when the cross-section of the clamping jaw is symmetrical, that is, when pressing lands extend on both sides of the pressing groove, because it then becomes irrelevant in which position the press tool is applied to the point that is to be pressed.

In the application of a press tool of the type described in the beginning, in which the cross-section of the clamping jaws is symmetrical, it has been shown that the pressing land that lies on the open end of the press fitting, in the final phase of the pressing process, also comes to be applied to the pipe, where it causes a constriction of the pipe. Aside from the fact that this increases the amount of pressing force that must be applied, the elastic tension of the conical nipple is reduced via the pressing of the annular ring, so that the maintenance of the required tightness over a period of years can no longer be ensured. In the worst case, a fissure could even form in the area of the seal, which would result in leakage.

It is thus the object of the invention to design a press tool of the type described at the beginning, that will allow the maintenance of mounting safety while permitting pressing that will not affect tightness.

This object is attained in accordance with the invention in that a template which fits over the nested workpiece but not over the slid-on workpiece is positioned toward the other side of the groove.

With a press tool of this type, foolproof handling is ensured, despite the fact that a pressing land is positioned along only one side of the groove. This permits the advantages of press tools having asymmetrical clamping jaws to be realized without adversely affecting mounting safety. The main advantage is that deformations of the pipe in the area of the open end of the press fitting are avoided, thus the elastic tension in the conical nipple is not impeded as a result of pressure on the annular ring. This increases mounting safety as well as the guarantee of tightness over a period of years.

It should be noted that a specific press tool is suitable only for pressing a workpiece having a specific diameter, thus any reference to a workpiece also contains information regarding the dimensions of the press tool. The additional attachment of a template prevents the press tool from being mounted in a wrong position, in which the pressing land would end up on the side of the annular ring that is closest to the open end of the press fitting, because in this position, the template prevents mounting on the pressing point at the wrong position, at which the pressing land would lie on the side of the annular ring that is directed toward the open end of the press fitting; in this position the template prevents any application of the press tool because it does not fit over the press fitting. Only in the reverse position, in which the template lies outside of the press fitting, is it possible to apply the press tool.

The template is comprised, in a particularly simple design, of a correspondingly shaped, metal component which is affixed to one of the clamping components.

In the diagrams, the invention is illustrated in greater detail with reference to one exemplary embodiment.

Figure 2:
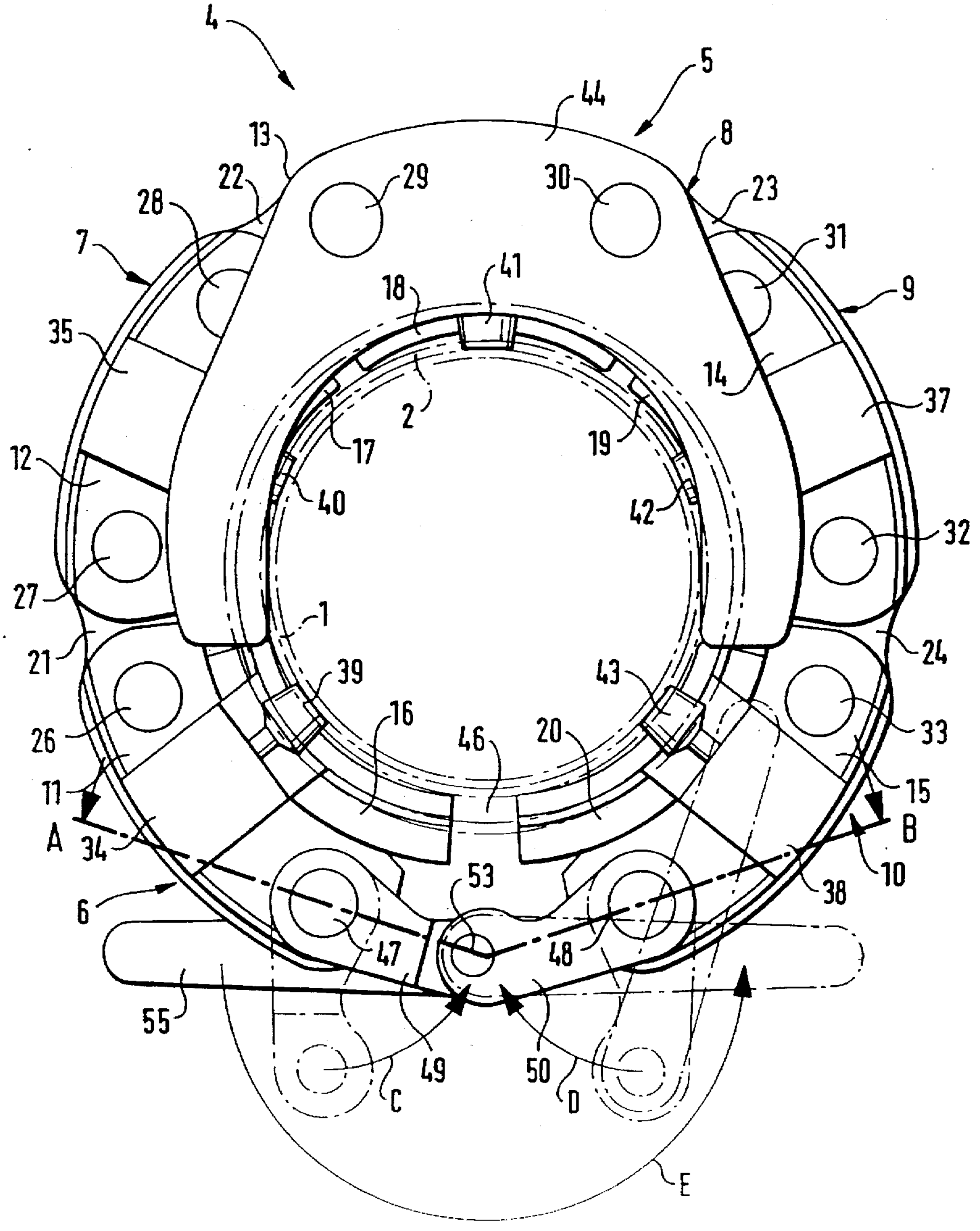
Figure 3:
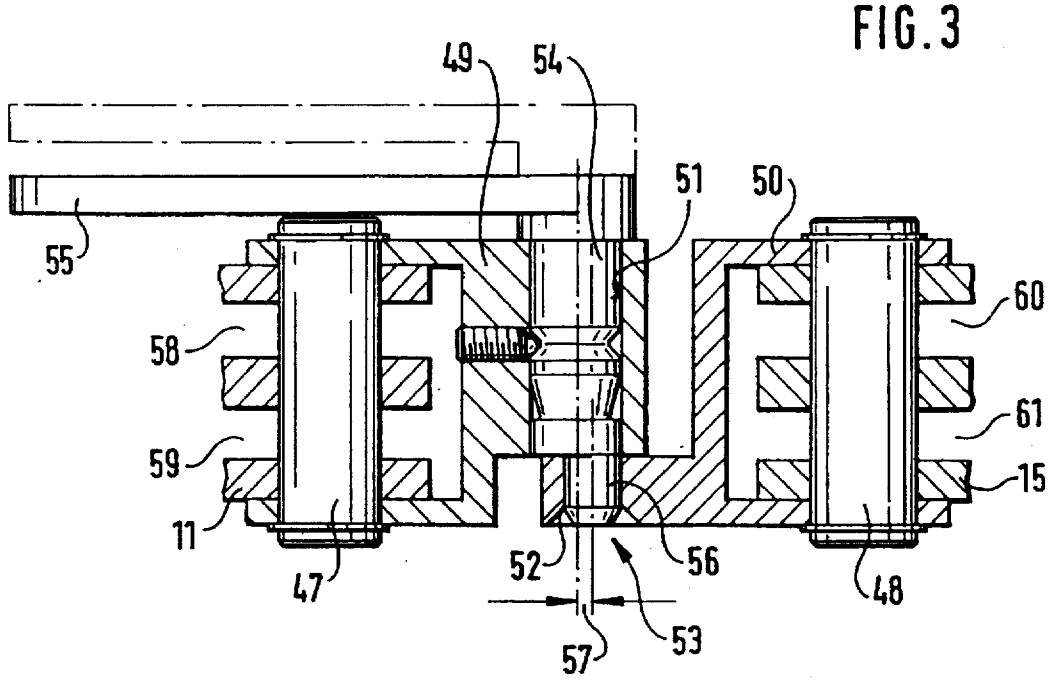
Figure 4:
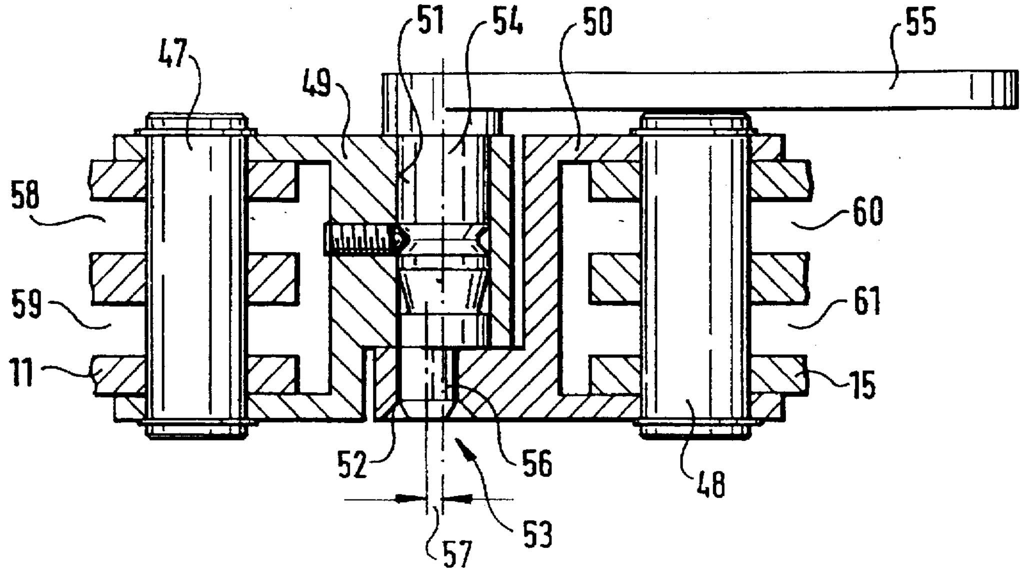
Figure 5:
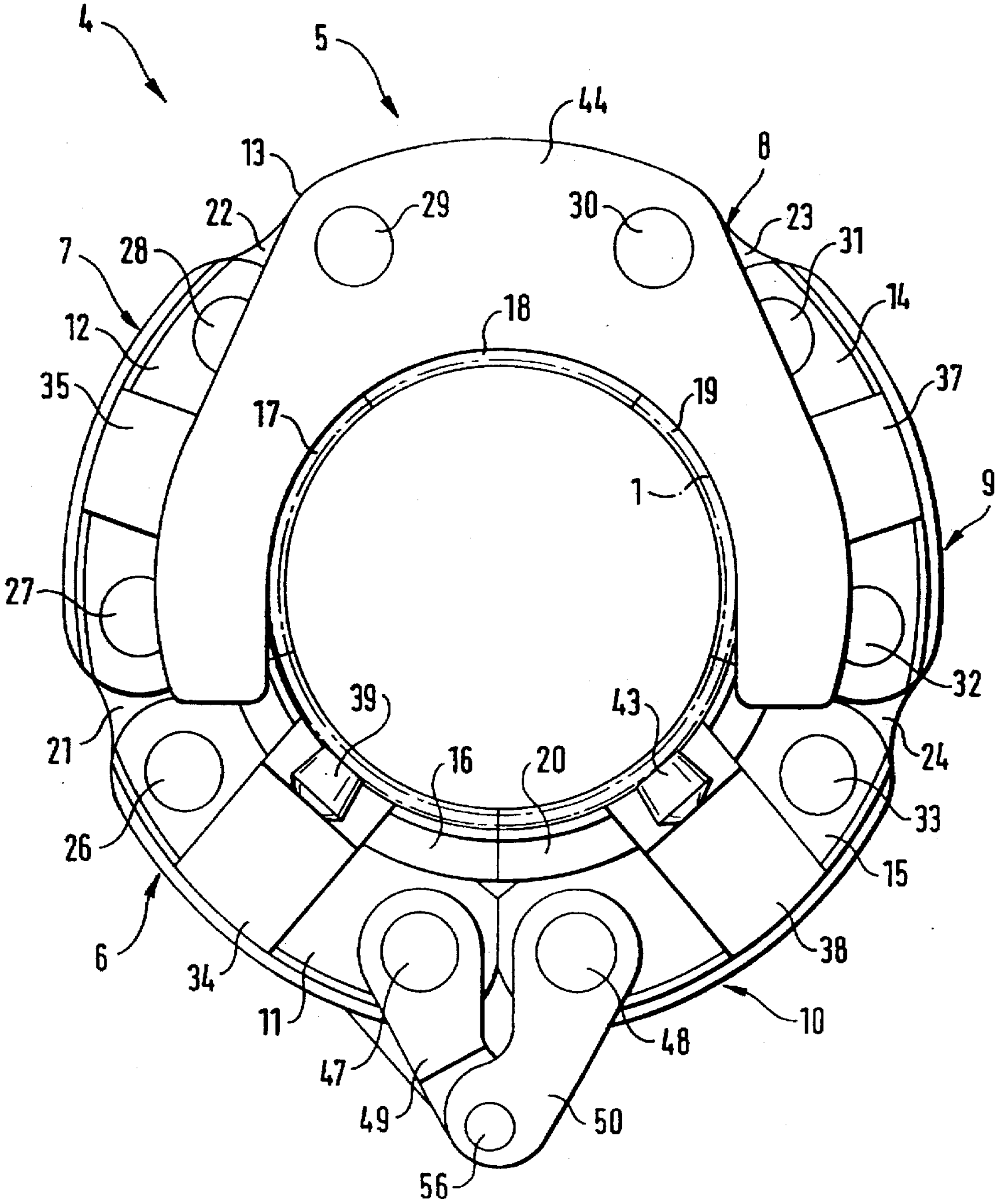
Figure 6:
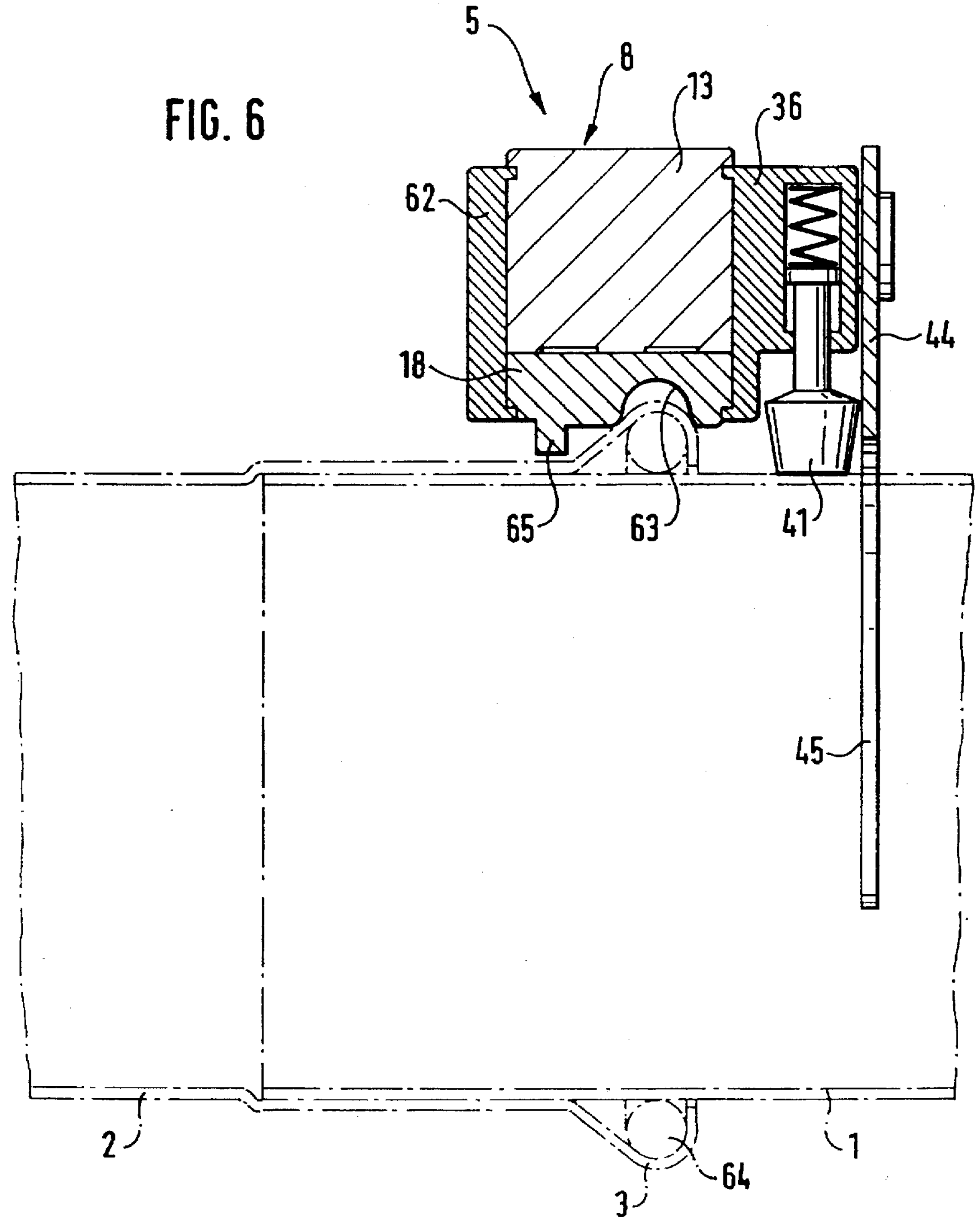

These diagrams show:

FIG. 1—the wraparound ring of a press tool in an opened position;

FIG. 2—the wraparound ring in accordance with FIG. 1 in a closed position;

FIG. 3—a sectional view of the coupling member of the wraparound ring in accordance with FIGS. 1 and 2 as indicated by plane A–B, with the coupling member in a loose position;

FIG. 4—the coupling member in the representation in accordance with FIG. 3, in a taut position;

FIG. 5—the wraparound ring in accordance with FIGS. 1 through 4 in its position following the pressing process; and FIG. 6—a longitudinal section of the wraparound ring with pipe end and press fitting, after it has been mounted onto the workpiece.

In FIGS. 1, 2, and 5, a cross-section of a pipe end (1) and a press fitting (2) that has been slid onto the pipe end, with an annular ring (3) that contains a conical nipple, are indicated by a dot-dashed line. The pipe end (1) and press fitting (2) are to be pressed using a press tool (4), of which only the wraparound ring (5) is illustrated in FIGS. 1, 2, and 5.

The wraparound ring (5) in this exemplary embodiment contains clamping components (6, 7, 8, 9, 10) that are essentially identical in design, with each clamping component (6, 7, 8, 9, 10) being comprised of an outer clamping bracket (11, 12, 13, 14, 15) and an inner, curved, clamping jaw (16, 17, 18, 19, 20). With one exception, the clamping brackets are connected to one another via adapters (21, 22, 23, 24), with the clamping brackets (11, 12, 13, 14, 15) being hinged via hinge pins (26, 27, 28, 29, 30, 31, 32, 33) to the adapters (21, 22, 23, 24).

In each case at least one hinge pin (26, 27, 28, 29, 30, 31, 32, 33) per adapter (21, 22, 23, 24) is designed to be removable, so that the wraparound ring (5) can be dismantled into individual clamping components (6, 7, 8, 9, 10) or can be assembled from these on the spot. The clamping jaws (16, 17, 18, 19, 20) are positioned in the clamping brackets (11, 12, 13, 14, 15) such that they can shift circumferentially.

A clamping device (34, 35, 36, 37, 38) is attached to each clamping bracket (11, 12, 13, 14, 15) and contains a clamping piston (39, 40, 41, 42, 43) that is directed radially toward the inside and is held under spring tension. The clamping devices (34, 35, 36, 37, 38) also serve in the axial guidance of the clamping jaws (16, 17, 18, 19, 20).

The hinge pins (29, 30) on the center clamping bracket (13) support a jaw-shaped template (44) in the form of a metal component containing a semi-circular recess (45), in which the radius of the recess (45) is such that the template (44) fits over the pipe end (1) but not over the cylindrical portion of the press fitting (2) that is adjacent to the annular ring (3). This ensures that the wraparound ring (5) can be placed around the combination of pipe end (1) and press fitting (2) in only one, preferred way.

The lower clamping components (6, 10) have between them, in the positions indicated in FIGS. 1 and 2, a closing gap (46). In FIG. 1 this gap is large enough that the wraparound ring (5) can be placed over the press fitting (2) and the pipe end (1). The free ends of the clamping components (6, 10) that are adjacent to the closing gap (46) contain hinge pins (47, 48), with a coupling bracket (49, 50) being suspended from each hinge pin (47, 48). The shape of the coupling brackets (49, 50) and their connection to the hinge pins (47, 48) are indicated specifically in the sectional illustration in accordance with FIGS. 3 and 4.

The free ends of the coupling brackets (49, 50) contain openings (51, 52). A coupling pin (53) is inserted axially into the boring (51) in the coupling bracket (49). This pin contains a first pin segment (54), which extends through the boring (51). One end of the first pin segment (54) is connected to a hand lever (55). At the other end of the first pin segment (54) is a second pin segment (56), the axis of which is displaced in relation to the first pin segment (54) by a degree of eccentricity (57). The second pin segment (56) fits into the boring (52) in the other coupling bracket (50). The coupling brackets (49, 50), together with the coupling pins (53), form a coupling element for the temporary connection of the ends of the wraparound ring (5) prior to the actual pressing process.

As is apparent from the illustration in FIG. 6, the clamping jaws (16, 17, 18, 19, 20) are directed not only axially via the clamping devices (34, 35, 36, 37, 38), but also via guide plates (62) that are screwed onto the other side of the clamping brackets (11, 12, 13, 14, 15). The clamping jaws (16, 17, 18, 19, 20) themselves are asymmetrical in their cross-section.

They contain a ring groove (63), with the pressing grooves (63) of all the clamping jaws (16, 17, 18, 19, 20) combining to form a continuous circumferential ring groove. The cross-section of the pressing groove (63) conforms to the annular ring (3), which has on its inner side a conical nipple (64).

A pressing land (65) extends along one side of the ring groove (63). It also combines with the pressing lands of the other clamping jaws (16, 17, 18, 19, 20) to form a continuous circumferential pressing land. The pressing land (65) is intended to dig into the material of the press fitting (2) during the pressing process, and also to dig into the pipe end (1) in order to shape it. No such pressing land is present on the other side of the ring groove (63).

In a pressing process, the opened wraparound ring (5) is first placed over the pipe end (1) and the press fitting (2), as is indicated in FIGS. 1 and 6. When the wraparound ring (5) is on the pipe end (1) or press fitting (2), the two lower clamping components (6, 10) are swung toward one another and on the pipe end (1), so that they assume the position illustrated in FIG. 2. The coupling brackets (49, 50) that then remain suspended, a position which is indicated in FIG. 2 by a dot-dashed line, are then swung toward one another in the directions of arrows C and D. The coupling pin (53) is then in a position in which its second pin segment (56) does not protrude from the boring (51), which is indicated in FIG. 3 by the dot-dashed line indicating the position of the hand lever (55).

The horizontal sweep of the coupling brackets (49, 50) continues up to the position at which they overlap and the borings (51, 52) merge. The coupling pin (53), and thereby also the hand lever (55), are then in a position in which the second pin segment (56) is shifted toward the other coupling bracket (50), and can thus easily be set into its boring (52) via the axial shifting of the coupling pin (53), and can thereby join the two coupling brackets (49, 50). In this position, the wraparound ring (5) still maintains a certain degree of slack.

The hand lever (55) is then swung 180° from the position indicated in FIG. 2 by solid lines, into the position indicated by a dot-dashed line, in the direction of the arrow E. This causes the second pin segment (56) to execute an eccentric motion and to shorten the distance between the two hinge pins (47, 48) by double the eccentricity (57). This is made clear in the comparison of FIGS. 3 and 4, with FIG. 4 illustrating the swung position. This movement exerts a peripheral force on the wraparound ring (5), which causes the clamping jaws (16, 17, 18, 19, 20) to press with a certain degree of radial tension on the press fitting (2). The wraparound ring (5) then has a fit that cannot be rotated or is at least very difficult to rotate. This effect is enhanced by the clamping pistons (39, 40, 41, 42, 43), which then press against the pipe end (1) with equal, radially directed tension.

Now the actual pressing process can begin. In this process, a closing device, which will not be described in greater detail and is part of the press tool (4), is used, as is known schematically from FIG. 7 of EP-A-0 451 806. This closing device contains two tong-shaped lever arms, by means of which the closing device can be attached to the hinge pins (47, 48). This causes them to extend through spaces (58, 59) or (60, 61) and to be adjacent to the outsides of the hinge pins (47, 48). The tong-shaped lever arms are then brought together by means of a hydraulic motor that is part of the closing device, so that the hinge pins (47, 48) approach one another. The result of this is that the wraparound ring (5) becomes constricted, which causes the press fitting (2) and the pipe end (1) to be radially compressed, in which the pressing land (64) digs somewhat into the material of the press fittings (2) and the annular ring (3) is pressed against the pipe end (1), such that the conical nipple (64) becomes pressed onto the pipe end (1) with an amount of radial pressure that is necessary to ensure a good seal. In this process, the clamping jaws (16, 17, 18, 19, 20) are automatically displaced circumferentially, to the point at which the surfaces of the clamping jaws (16, 17, 18, 19, 20) are touching. At the same time, the coupling brackets (49, 50)

yield toward the outside, which keeps them from interfering with the pressing process. Following the conclusion of the pressing process, the wraparound ring (5) assumes the position illustrated in FIG. 5. After the axial displacement of the coupling pin (53), which causes the second pin segment (56) to slip out of the boring (52), the wraparound ring (5) can be removed and used for other pressing processes.

I claim:

1. Press tool for pressing tubular, inner and outer nested workpieces (1, 2), in particular a pipe end (1) upon which is slid a press fitting (2), said press tool comprising several clamping components (6, 7, 8, 9, 10) that contain clamping jaws (16, 17, 18, 19, 20) with a continuous circumferential pressing groove (63) shaped in their inner sides, said jaws having a pressing land (65) that protrudes and extends along only one side of the pressing groove (63), there being no such pressing land (65) on the other side of said pressing groove (63), and a template (44) which fits over the inner nested workpiece (1) but not over the outer and slid-on workpiece (2), said template being positioned on the other side of the pressing groove from the pressing land, and wherein there is no such template (44) on the pressing land side of said pressing groove.

2. Press tool in accordance with claim 1, characterized in that the template (44) is shaped so as to have a semi-circular recess.

3. Press tool in accordance with claim 2, characterized in that the template is comprised of a metal component that is affixed to one of the clamping components (8).

4. Press tool in accordance with claim 1, characterized in that the template is comprised of a metal component that is affixed to one of the clamping components (8).

5. A press tool used in radially pressing together a tubular pipe end (1) and a tubular press fitting (2) slid thereonto, the press tool comprising:

a plurality of radially clamping components including clamping jaws for circumferentially surrounding the tubular pipe end and press fitting to be radially pressed;

a continuous pressing groove (63) defined in inner sides of said clamping components, said groove to circumferentially surround said pipe end and press fitting;

a pressing land (65) protruding inwardly from a surface of said clamping components and extending along only one side of said pressing groove on the inner side of said clamping components, there being no such pressing land (65) on the other side of said pressing groove, said pressing land for circumferentially surrounding said pipe end and said press fitting; and a template (44) which fits over the pipe end (1), but not over the press fitting (2), said template being located on the other side of said pressing groove from said pressing land so that the clamping components can be placed around the tubular pipe end and tubular press fitting in only one way, and wherein there is no such template on the pressing land side of said pressing groove.

6. The press tool of claim 5, wherein each clamping component includes an outer clamping bracket and one of said clamping jaws.

7. The press tool of claim 6, wherein a plurality of said clamping brackets include clamping pistons directed radially inward and held under tension.

8. The tool of claim 5, further comprising a hand lever (55) which when swung causes a pin segment (56) to execute an eccentric motion to shorten the distance between two hinge pins (47, 48).

* * * * *